March 11, 1958 C. W. DAVIS 2,825,978
ELECTROMECHANICAL SENSING DEVICE
Filed Aug. 1, 1955 2 Sheets-Sheet 1
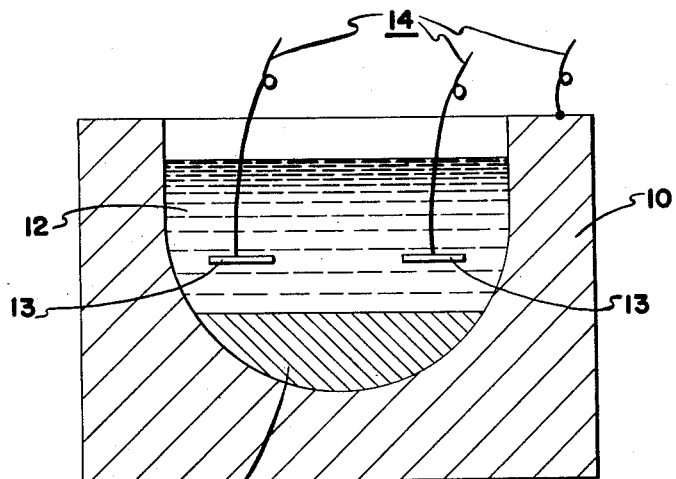
FIG.-1-
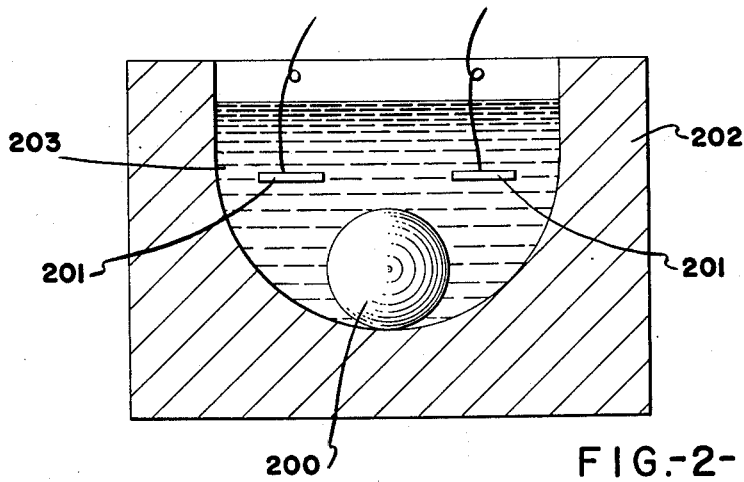
FIG.-2-
CLYDE W. DAVIS
*INVENTOR.*
BY
HIS ATTORNEY

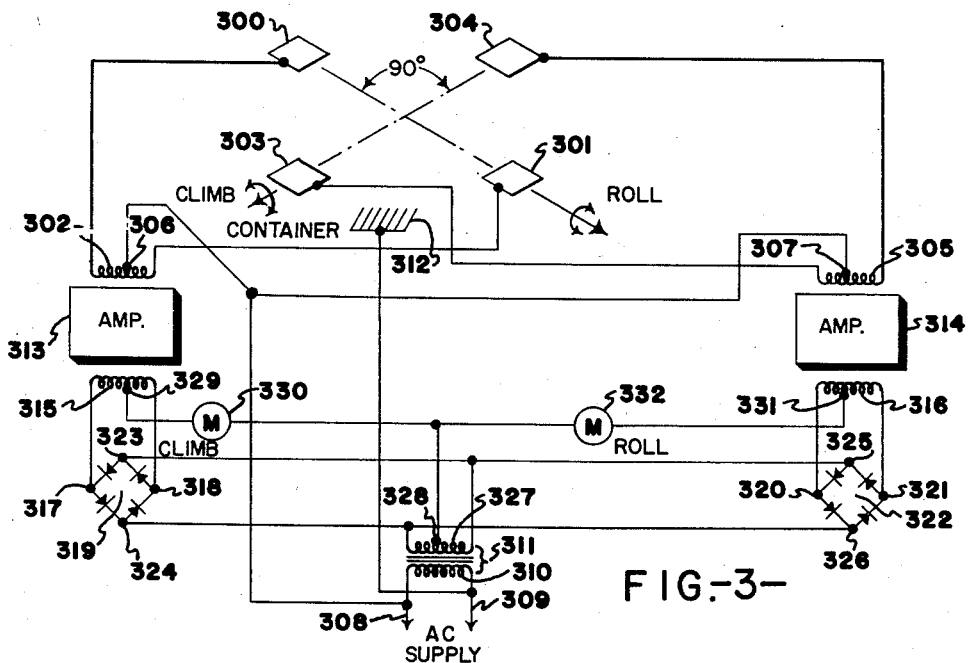
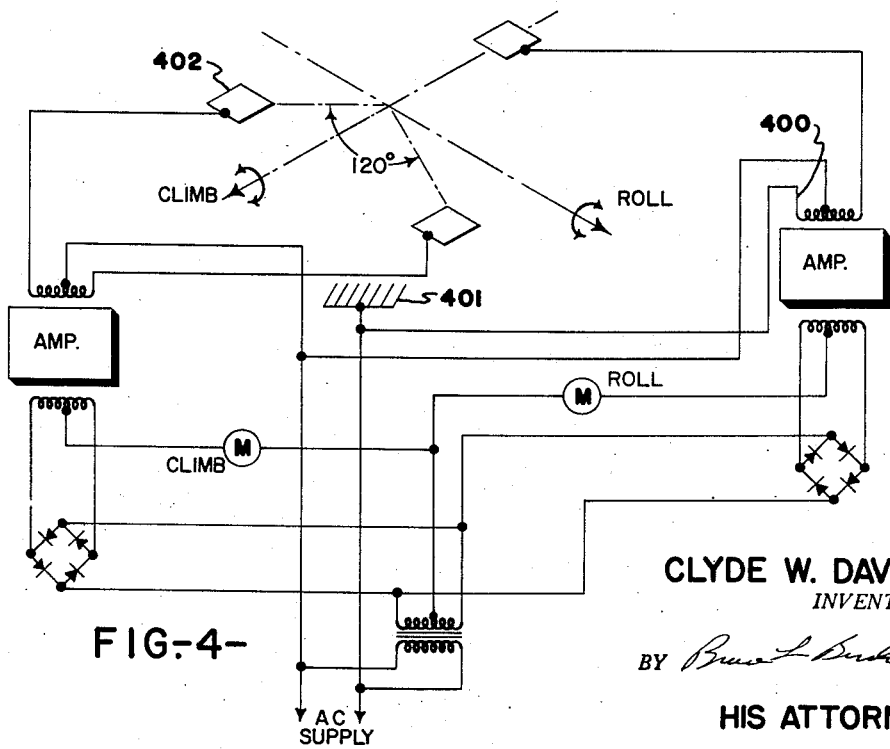

2,825,978

Patented Mar. 11, 1958

2,825,978

ELECTROMECHANICAL SENSING DEVICE

Clyde W. Davis, Reseda, Calif., assignor to Hoffman Electronics Corporation, a corporation of California Application August 1, 1955, Serial No. 525,699

13 Claims. (Cl. 33—206)

This invention is related to electromechanical sensing devices, and more particularly, to a new and improved electromechanical sensing device adapted to sense the roll and climb angles of disposition of a body provided with such a device, this body being subject to tilt tendencies in any or all directions.

In the past, there have been many attempts to design suitable roll and climb sensing devices which will give accurate indication of tilt angle of a body associated therewith, such body being subject to tilt in one or more directions. The probable error encountered by the use of sensing devices on the market at the present time presents quite a problem in ascertaining with any degree of accuracy the precise angles of roll and climb of objects associated with such devices.

Therefore, it is an object of the present invention to provide a new and useful electromechanical sensing device which is capable of sensing angles of roll and climb of an associated object with a high degre of accuracy, i. e., a probability of error plus or minus one-quarter of a degree or less.

According to the present invention, a suitably contoured container encloses a quantity of conductive fluid or spherical object and also a suitable damping fluid. Disposed in proximate relation with the conductive fluid or spherical body are a plurality of capacitive probes uniquely oriented with respect to the conductive fluid or spherical body in the normal condition. Deviation from the normal disposition of the conductive fluid or sphere creates an unbalanced condition in an electrical circuit associated with the capacitive probes, which condition produces current flow of corresponding character through A. C. or D. C. roll and climb current meters. The meter readings of the roll and climb indicators correspond with the physical disposition of the conductive fluid or sphere within the associated container with respect to the normal or level condition.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1 is a diagrammatic presentation of a container and associated equipment of the electromechanical sensing device, according to the present invention.

Figure 2 is a sketch of a second embodiment of the container and associated equipment of the present invention.

Figure 3 is a schematic diagram of an electrical circuit associated with four capacitive probes as utilized by the container.

Figure 4 is a schematic diagram of an electrical circuit associated with three capacitive probes as utilized by the container.

In Figure 1, container 10 has an inner contoured surface and contains a portion of mercury 11 which is electrically conductive and also damping fluid 12. Capacitive sensing plates 13 are suitably disposed immediately above mercury 11. Electrical connections 14 are provided for connecting capacitive sensing plates 13 and container 10 to external circuitry of which the circuits described in Figures 3 and 4 are representative.

Figure 1 operates as follows. The tilting of container 10 will be accompanied by a movement of mercury 11 within container 10 so as to alter the capacitance exhibited by the combination of mercury 11 and the various capacitive sensing plates 13. Hence, by the appropriate insertion of capacitors 13 in a suitable bridge circuit hereinafter more fully described, with reference to Figures 3 and 4, an electrical condition corresponding to the physical location of mercury 11 within container 10, and thus the tilt angle of container 10, will exist and can easily be measured by electrical means. The embodiment of a sensing means as shown in Figure 2 is the substantial equivalent of that shown in Figure 1 with the exception that conductive ball 200 is substituted in lieu of the mercury in Figure 1 and combines with capacitive sensing plates 201 to provide the essential capacitive bridge network. Also located within container 202 is a suitable damping fluid 203. The operation of the embodiment shown in Figure 2 will be substantially the same as that of Figure 1.

In Figure 3 capacitive sensing plate 300 and capacitive sensing plate 301 are coupled to opposite ends of transformer winding 302. All sensing plates are preferably disposed 90° apart. Sensing plates 303 and 304 are coupled to opposite ends of transformer winding 305. Center taps 306 and 307 of transformer windings 302 and 305, respectively, are coupled to each other and to a first A.-C. supply lead 308. A.-C. supply lead 309 is coupled through primary winding 310 of transformer 311 to A.-C. supply lead 308 and also to container 312 (corresponding to containers 10 or 202 of Figures 1 and 2, respectively). Amplifier stages 313 and 314 may be interposed between transformer windings 302 and 315 and transformer windings 305 and 316, respectively, if such amplification is needed. Terminals 317 and 318 of diode bridge 319 are coupled to either end of transformer winding 315. Terminals 320 and 321 of diode ring 322 are connected to either end of transformer winding 316. Diode ring terminals 323 and 324 are coupled to terminals 325 and 326, respectively, and also to either end of secondary winding 327 of transformer 311. Center tap 328 of secondary winding 327 is coupled to center tap 329 of transformer 315 through "climb" meter 330 and to center tap 331 of transformer winding 316 through "roll" meter 332.

The circuit of Figure 3 operates as follows. If the capacity between sensing plate 300 and container 312 is equivalent to the capacity between sensing plate 301 and container 312, no current will flow through high resistance "climb" meter 330. The same is equally true with respect to sensing plates 303 and 304 and "roll" meter 332. If there is a difference or change in the relative capacities between container 312 and opposite sensing plates an electrical unbalanced condition will exist in the circuit. That is to say, the amplitude and phase of the currents flowing in either half of transformer winding 302, considering separately for the moment the climb portion of the electrical circuit, will undergo a change which will be reflected in the ring demodulator portion of the circuit (consisting of transformer winding 315, diode ring 319, and secondary winding 327). By virtue of such unbalance currents will commence to flow in "climb" meter 330. Thus, the meter reading of meter 330 will be an indication of the relative capacities of corresponding plates as relate to container 312. The above discussion is equally applicable in the other ring demodulator portion of the circuit (consisting of transformer winding 316, diode ring 322, and secondary winding 327 of transformer 311). "Roll" and "climb" meters 332 and 330 may comprise either A. C. or D. C. high resistance ammeters.

The circuit of Figure 4 is identical with that of Figure 3 with the exception that only three sensing plates are employed, the remaining lead 400 being coupled directly to container 401. In the case of the configuration of Figure 4 sensing plates 402 are preferably disposed 120° apart from each other, as shown.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An electromechanical sensing device including, in combination, means responsive to rotational variations in disposition thereof about either or both of two axes of rotation for providing a continuous electrical condition, said means comprising a conductive container having an electrical connection and a hemispherically curved continuously conductive inner surface, a movable conductive body disposed within said container and in continuous electrical connection with said inner surface thereof, damping fluid disposed within said container over said movable conductive body, and a plurality of coplanar capacitive sensing plates having electrical connections and disposed within said container in a normally horizontal plane above said movable conductive body and in proximate relation thereto; means coupled to said electrical condition providing means and responsive to said electrical condition thereof for producing current flow related in a characteristic to said electrical condition in either or both of first and second circuit branches; and first and second means interposed, respectively, in said first and second current branches and responsive to current flow therein for providing continuous visual indication of the magnitude of said characteristic of said current flow.

2. Apparatus according to claim 1 in which said movable conductive body comprises a sphere-shaped conductive object.

3. Apparatus according to claim 1 in which said movable conductive body comprises a conductive fluid.

4. Apparatus according to claim 1 in which said capacitive sensing elements are three in number disposed 120° apart.

5. Apparatus according to claim 1 in which said capacitive sensing elements are four in number disposed 90° apart.

6. Apparatus according to claim 2 in which said capacitive sensing elements are three in number disposed 120° apart.

7. Apparatus according to claim 2 in which said capacitive sensing elements are four in number disposed 90° apart.

8. Apparatus according to claim 3 in which said capacitive sensing elements are three in number disposed 120° apart.

9. Apparatus according to claim 3 in which said capacitive sensing elements are four in number disposed 90° apart.

10. Apparatus according to claim 4 in which said current flow producing means comprises: first and second terminals adapted for coupling to an A.-C. supply; a first transformer winding coupled between first and second capacitive sensing elements of said plurality and having a center tap coupled to said first terminal; a second transformer winding coupled between a third capacitive sensing element of said plurality and said container and having a center tap coupled to said first terminal; said second terminal being coupled to said container; a transformer having a primary winding coupled across said first and second terminals and a secondary winding having first and second end terminals and a center tap; first and second diode ring circuits each having a first terminal coupled to said first terminal of said transformer secondary winding, a second terminal coupled to said second terminal of said transformer secondary winding, and third and fourth terminals; a third transformer winding coupled to said first transformer winding and having a first end terminal coupled to said third terminal of said first diode ring circuit, a second end terminal coupled to said fourth terminal of said first diode ring circuit, and a center tap coupled through said first indication means to said center tap of said transformer secondary winding; and a fourth transformer winding coupled to said second transformer winding and having a first end terminal coupled to said third terminal of said second diode ring circuit, a second end terminal coupled to said fourth terminal of said second diode ring circuit, and a center tap coupled through said second indicating means to said center tap of said transformer secondary winding.

11. Apparatus according to claim 5 in which said current flow producing means comprises: first and second terminals adapted for coupling to an A.-C. supply; a first transformer winding coupled between first and second capacitive sensing elements of said plurality and having a center tap coupled to said first terminal; a second transformer winding coupled between third and fourth capacitive sensing elements of said plurality and having a center tap coupled to said first terminal; said second terminal being coupled to said container; a transformer having a primary winding coupled across said first and second terminals and a secondary winding having first and second end terminals and a center tap; first and second diode ring circuits each having a first terminal coupled to said first terminal of said transformer secondary winding, a second terminal coupled to said second terminal of said transformer secondary winding, and third and fourth terminals; a third transformer winding coupled to said first transformer winding and having a first end terminal coupled to said third terminal of said first diode ring circuit, a second end terminal coupled to said fourth terminal of said first diode ring circuit, and a center tap coupled through said first indication means to said center tap of said transformer secondary winding; and a fourth transformer winding coupled to said second transformer winding and having a first end terminal coupled to said third terminal of said second diode ring circuit, a second end terminal coupled to said fourth terminal of said second diode ring circuit, and a center tap coupled through said second indicating means to said center tap of said transformer secondary winding.

12. Apparatus according to claim 10 in which a first amplifier is interposed between said first and third transformer windings and a second amplifier is interposed between said second and fourth transformer windings.

13. Apparatus according to claim 11 in which a first amplifier is interposed between said first and third transformer windings and a second amplifier is interposed between said second and fourth transformer windings.

References Cited in the file of this patent

UNITED STATES PATENTS

| 1,889,921 | Jakosky | Dec. 6, 1932 |
| 2,553,268 | Noxon et al. | May 15, 1951 |
| 2,711,590 | Wilcox | June 28, 1955 |

FOREIGN PATENTS

| 132,637 | Great Britain | Sept. 25, 1919 |
| 645,332 | Great Britain | Nov. 1, 1950 |
| 912,493 | France | Apr. 29, 1946 |
| 583,425 | Germany | Sept. 4, 1933 |
| 365,947 | Italy | Dec. 16, 1938 |